UNITED STATES PATENT OFFICE.

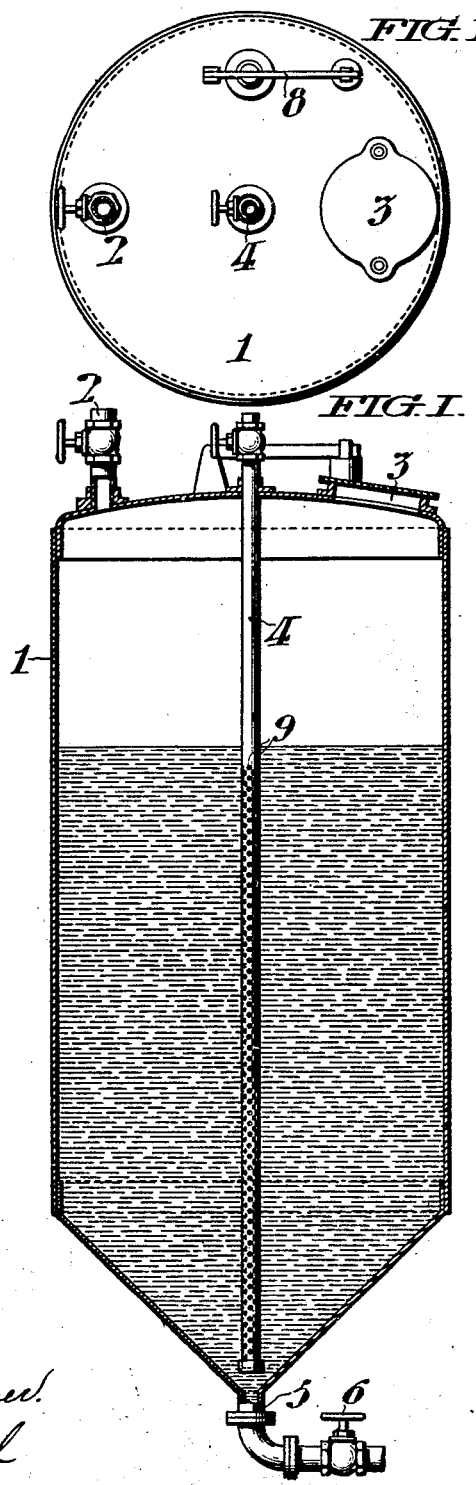

EBERHARD LUTTGEN, OF AMBLER, PENNSYLVANIA, ASSIGNOR TO KEASBEY & MATTISON COMPANY, OF AMBLER, PENNSYLVANIA, A CORPORATION OF PENNSYLVANIA.

MANUFACTURE OF HEAT-INSULATING MATERIALS.

No. 845,365.     Specification of Letters Patent.     Patented Feb. 26, 1907.

Application filed December 24, 1906. Serial No. 349,229.

*To all whom it may concern:*

Be it known that I, EBERHARD LUTTGEN, residing at No. 808 Lindenwold avenue, Ambler, in the county of Montgomery and State of Pennsylvania, have invented certain new and useful Improvements in the Manufacture of Heat-Insulating Materials, whereof the following is a specification, reference being had to the accompanying drawings.

My present invention relates to a process for the production of heat-insulating structures, such as are produced from a plastic combination of a porous mineral cement, such as carbonate of magnesia, with a fibrous substance, such as asbestos.

The invention also relates to the resulting structure, for which practical purposes the heat-insulating structures to which my invention is applicable are composed almost entirely of inorganic materials and may therefore be classified as "inorganic heat-insulators."

It is a well-known fact that the efficiency of a heat-insulating material depends very largely upon its porosity—that is to say, upon the proportion that the volume of entrapped air bears to the whole volume of the insulating mass. Some of the mineral substances now employed in the manufacture of heat-insulating coverings are comparatively lacking in voids or air-cells and are consequently dense and of slight or mediocre value as retarders of radiated heat. Other materials, notably carbonate of magnesia and plaster-of-paris, when properly prepared, are porous, and are therefore efficient as heat-insulators. It is the object of the process which I have invented and will now describe to increase by artificial means the natural porosity of structures or coverings made from these and other similar substances, and thereby to enhance their value as heat-insulators.

I will describe my invention as applied to heat-insulating structures as made of magnesium carbonate and asbestos fiber; but it must be understood that other suitable materials may be employed.

In carrying out my process it is convenient to employ an apparatus such as is figured in the accompanying drawings, in which—

Figure I represents the apparatus in vertical section, and Fig. II represents a plan view of the same.

The plastic mixture is prepared in the tank 1, the magnesium carbonate and water being introduced by way of the pipe 2, and the asbestos fiber by way of the manhole 3. Proper proportions of these materials are introduced and mixed in the tank. After the mixture is properly proportioned air-pressure is introduced by way of the pipe 4. The lower end of the tank is conical, ending in an outlet-pipe 5, controlled by the valve 6. When the proper degree of pressure is attained, the valve 6 is turned to open the outlet, and the plastic mixture is driven by the air-pressure into a mold which is connected with the outlet-pipe. The mold is not shown in the drawings, as it may be of any suitable shape, depending upon the shape of the structure which is to be produced. The tank 1 is a strong and pressure-proof vessel, and it may be of any convenient form. The top of the tank is equipped with a safety-valve 8 for the escape of air over a given pressure—say thirty or forty pounds to the square inch.

According to my invention the pipe 4, by which the compressed air is supplied to the tank, instead of terminating above the plastic mixture which is to be driven into the mold runs down through the center of the tank and terminates near the bottom thereof. It is perforated at intervals with small holes 9, and from these holes the compressed air which is to be used for ejecting the plastic material from the tank is driven through the mass, which is thus agitated, aerated, and inflated by reason of the passage of the air-bubbles up through the mixture. By this arrangement the compressed air entering the tank through the pipe serves a three-fold purpose—namely, it thoroughly mixes the combined materials, it aerates or leavens the resulting magma, and it supplies the pressure whereby the plastic material is forced into the mold. It will also be observed that the aeration of the mass is almost simultaneous with its ejection, so that while it is still filled with innumerable air-bubbles it passes into the mold where it quickly sets, trapping the air permanently in the small air-spaces formed in the structure by the aeration, thereby producing a heat-insulating material which is at the same time lighter and more efficient by reason of the mechanical introduction and entrapping of the air. After the plastic structure has set, it will be found to have its porosity and lightness increased proportionately to the amount of entrapped air, which has been injected or introduced into it by the herein-described procedure. In some cases it is expedient to add to the magma in in the aerating-tank some agglutinating substance—such as water-glass, flour-paste, or other mucilaginous material—in order to promote the occlusion of the minute air-bubbles in very much the same manner that the gases of fermentation are held within a mass of leavened dough.

Having thus described my invention, I claim—

1. The process of increasing the heat-insulating efficiency of a structure formed from a plastic mass of inorganic insulating substances, which consists in forming the component substances into a magma; aerating the same by compressed air driven into the mass; and immediately forcing the aerated mass into a mold before the entrapped air has had an opportunity to escape; and allowing it to set in the mold.

2. The process of increasing the efficiency of heat-insulating structures, which consists in preparing a mixture of inorganic heat-insulating substances with water in a suitable receptacle; aerating the magma thus formed while in the receptacle by means of a perforated pipe passing into the mass; and employing the pressure produced within the receptacle by the escape of the compressed air for mixing, aerating and then ejecting the plastic material, immediately following its complete aeration, from the receptacle into a suitable mold where it is allowed to set in its aerated condition.

3. A heat-insulating structure molded from a plastic mass of inorganic insulating materials, and containing both the air-spaces which result from the natural porosity of the materials, and additional air-spaces formed by the mechanical injection of air into the plastic mass prior to its setting.

In testimony whereof I have hereunto signed my name, at Philadelphia, Pennsylvania, this 21st day of December, 1906.

EBERHARD LUTTGEN.

Witnesses:
 JAMES H. BELL,
 E. L. FULLERTON.